United States Patent [19]
Cervenka

[11] Patent Number: 5,385,306
[45] Date of Patent: Jan. 31, 1995

[54] FERTILIZER SPREADER ATTACHABLE TO A LAWN MOWER

[76] Inventor: Joseph Cervenka, 1528 Pine Tree Ct., Lisle, Ill. 60532

[21] Appl. No.: 164,562

[22] Filed: Dec. 10, 1993

Related U.S. Application Data

[63] Continuation-in-part of Ser. No. 75,308, Jun. 14, 1993, abandoned.

[51] Int. Cl.⁶ ..................... A01C 17/00; A01C 19/02
[52] U.S. Cl. ................................. 239/663; 239/666; 239/684; 239/289; 56/16.8; 56/DIG. 5
[58] Field of Search ............... 239/663, 666, 670, 684, 239/685, 289, 379; 222/368, 613, 623, 624, 625; 56/16.8, DIG. 5

[56] References Cited

U.S. PATENT DOCUMENTS

| | | | |
|---|---|---|---|
| Re. 32,067 | 1/1986 | Emory | 56/16.8 |
| 730,908 | 6/1903 | Gray | 239/684 |
| 750,381 | 1/1904 | Love | 239/685 |
| 955,133 | 4/1910 | Butler | 239/685 |
| 1,058,468 | 4/1913 | Ruhland | 239/666 |
| 1,508,210 | 9/1924 | Bangert | 239/666 X |
| 1,835,641 | 12/1931 | Finfrock | 222/623 X |
| 1,876,409 | 9/1932 | Gordon | 56/DIG. 5 X |
| 2,723,053 | 11/1955 | Gandrud | 222/625 |
| 2,737,340 | 3/1956 | Bonini | 56/16.8 X |
| 2,792,970 | 5/1957 | Gaiman | 56/DIG. 5 X |
| 2,847,224 | 8/1958 | Stout | 56/DIG. 5 X |
| 2,906,438 | 9/1959 | Carpenter | 222/625 X |
| 3,102,375 | 9/1963 | Troka et al. | 56/16.8 X |
| 3,375,644 | 4/1968 | Harper | 56/16.8 |
| 3,383,053 | 5/1968 | Wood | 239/666 X |
| 3,477,212 | 11/1969 | Coffman | 222/625 X |
| 3,662,922 | 5/1972 | Gesior | 222/625 X |
| 3,942,308 | 3/1976 | Vicendese et al. | 56/16.8 |
| 4,027,627 | 6/1977 | Fillion | 239/666 X |
| 4,234,131 | 11/1980 | Baker | 239/685 |
| 4,666,069 | 5/1987 | Morine et al. | 222/368 |

Primary Examiner—William Grant
Attorney, Agent, or Firm—Patnaude, Videbeck & Marsh

[57] ABSTRACT

A spreader is attachable to a conventional lawn mower to spread granular material over the area cut by the mower. The spreader has a hopper, at least one adjustable orifice at the bottom of the hopper, and a rotating regulator for dispensing granular material behind the lawn mower. In one embodiment, a first sprocket attached to the wheel of the lawn mower, and a second sprocket attached to the spreader receive a chain for driving the rotating regulator of the spreader. In a second embodiment, the spreader is driven by a pair of bevel gears, one of which is mounted on the rear axle of the mower. A novel drive does not convey rotational movement to the impeller of the spreader when the mower is moved a short distance backwards. Also, the lever operating the clutch to engage power to the Pear wheels simultaneously operates a stop to block the flow of particulate matter out of the hopper of the fertilizer spreader.

8 Claims, 11 Drawing Sheets

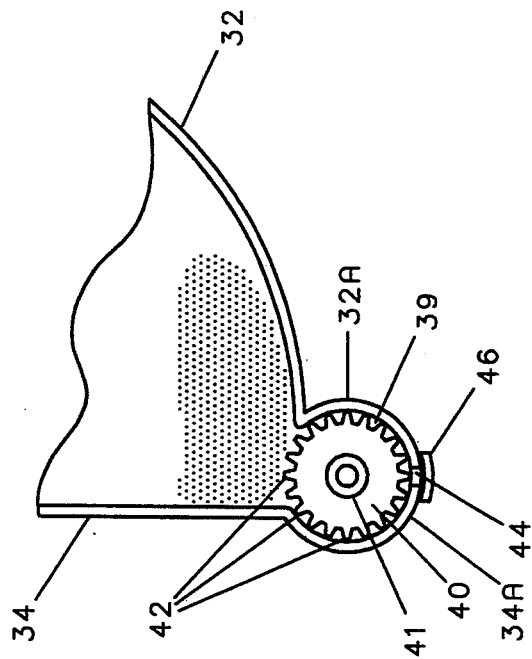
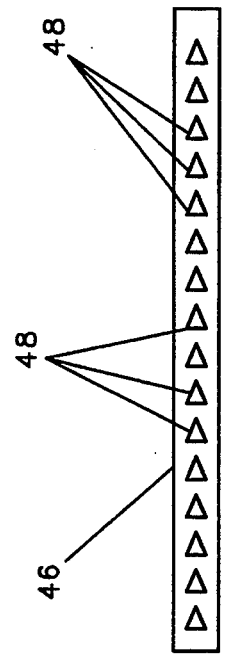
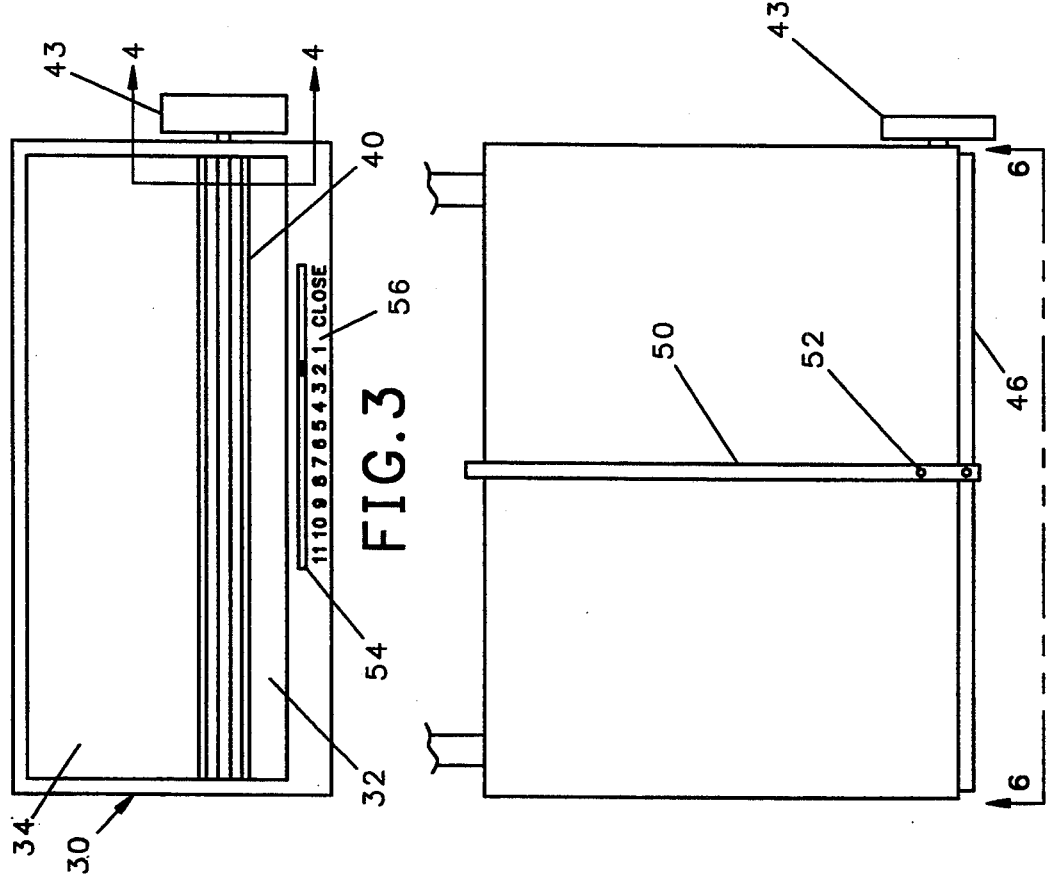
FIG. 3
FIG. 4
FIG. 5
FIG. 6

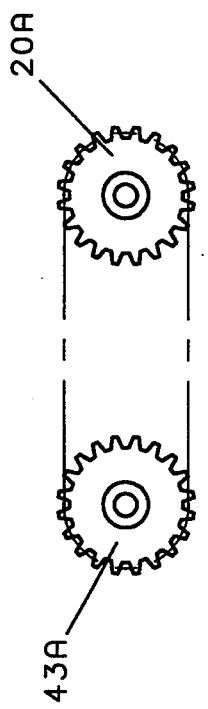
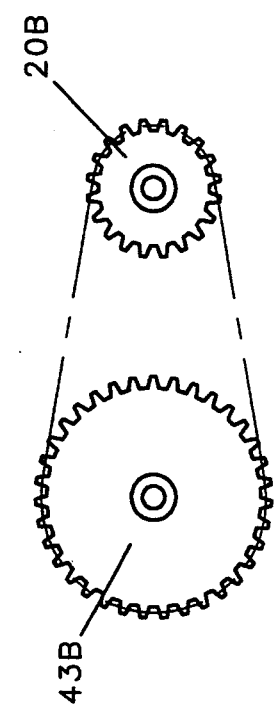
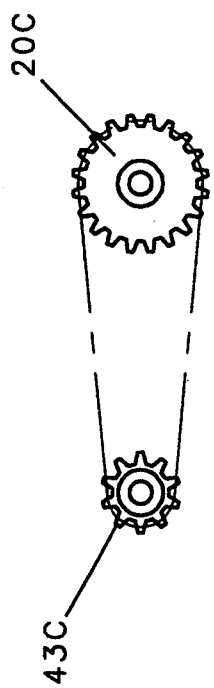
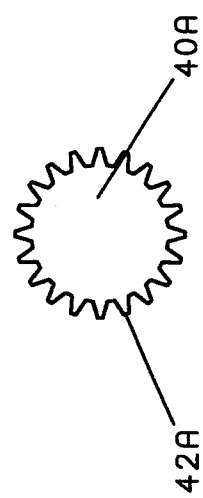
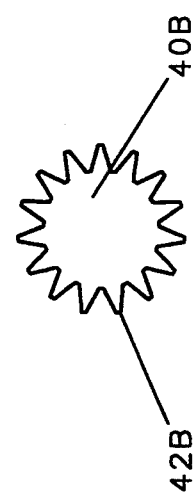
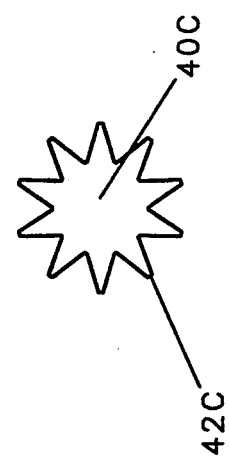

FERTILIZER SPREADER ATTACHABLE TO A LAWN MOWER

This application is a continuation-in-part of my co-pending application Ser. No. 08/075,308 filed on Jun. 14, 1993, now abandoned.

The present invention relates in general to fertilizer spreaders for use in applying dry fertilizer particles to grass lawns, and it relates more particularly to a spreader which is adapted to be attached to a lawn mower and used in conjunction therewith.

BACKGROUND OF THE INVENTION

It has been the common practice in the past to apply dry fertilizer to a lawn by pushing a drop or broadcast type spreader back and forth across the area to be fertilized. A problem with this procedure has been the necessity to overlap one pass with the next in order to assure that strips of the lawn are not missed. Of course, overlapping has the disadvantage of laying down narrow strips of a double dose of the fertilizer which can burn the lawn or leave it unsightly for some time.

Another problem with the prior art spreaders has been the necessity to open and close the fertilizer feed orifices at the end of each pass across the lawn as well as to close the orifices whenever the spreader is stopped to prevent excessive dropping of the fertilizer particles. This problem is more acute where the spreader is mounted to a power lawn mower and is thus continually vibrated by the mower.

A further problem with the prior art spreaders has been the fact that fertilizer is dropped from such spreaders whether the spreader is being pushed forward or pulled backward as occurs, for example, when fertilizer is being spread around trees and bushes.

SUMMARY OF THE INVENTION

Briefly, there is provided in accordance with one embodiment of the present invention a drop type spreader which is adapted to be attached to a conventional lawn mower and which includes an elongate, rotary regulator which is disposed over a plurality of adjustable feed orifices at the bottom of a hopper for containing a supply of dry fertilizer particles. The regulator and the associated feed orifices extend transversely to the direction of movement of the mower and have a length dimension equal to the width of the cut made by the mower so that fertilizer is laid down only in the mowed swath of lawn. The regulator is mechanically driven by the drive mechanism of the mower and is located behind the mower so that the falling fertilizer particles are not blown in any direction as they fall onto the lawn as would be the case, for example, if the fertilizer particles are to be dropped directly into the chamber in the mower housing which houses the cutting blade or blades. Moreover, the regulator is constructed so as to dispense fertilizer only while the mower is moving, and in addition, no fertilizer is dispensed when the mower is pulled backwards for a short distance as is common in lawn mowing.

It will be understood that when the fertilizer spreader of the present invention is used simultaneously with the cutting of a lawn by the associated mower, the mowed swath is visible to the person operating the mower and the spreader, and thus facilitates the accurate positioning of one strip of fertilizer relative to the next strip. As a consequence, overlapping or missed strips of lawn are avoided. An added benefit obtained by simultaneously mowing and fertilizing a lawn is the saving of time and effort inasmuch as both tasks are performed at the same time.

Preferably, the regulator is coupled to the drive mechanism of the mower by a belt or chain drive to prevent slippage when the wheels of the mower are wet and slippery and when the hopper is nearly empty as was the case with some prior art devices which employed a friction drive between the wheels of the mower and a driven wheel or wheels of an associated spreader.

Another embodiment of the invention incorporates a broadcast type spreader which is attached to the handle of a lawn mower and has a drive system similar to that of the first embodiment. A major advantage of the broadcast spreader embodiment is that an adjustable U-shaped shield is attached around the impeller to obstruct the spray of particulate matter disbursed in a forward direction or perpendicular to the path of movement of the lawn mower. Positioning the shield rearward results in a narrow path of fertilizer and positioning the shield forward results in a wider path of fertilizer. It may be adjusted from a minimum of one foot to a maximum of several feet, thus accommodating all mowing widths. In addition, the amount of overlap from row to row while lawn mowing varies with each operator's personal preference. This spreader adjustment accommodates these variances, thus preventing the lawn from being burned due to overlap applications which would result with the unadjustable drop spreader approach.

In yet another embodiment of the invention, a lawn mower suitable for attaching a fertilizer spreader thereto includes a housing, a cutting blade, and a plurality of wheels for transporting the mower across the surface of the earth. The mower also has a motor for driving the cutting blades and a drive means, including a clutch for directing rotational power from the motor to the rear axle of the mower. A drive member, such as a gear, is rotatably mounted on the axle and has a first thrust surface which engage a second thrust surface on a collar which rotates with the axle. The first drive member engages a second drive member on a fertilizer spreader mounted over the rear axle. A mower having a fertilizer spreader attached thereto can be moved backwards for a short distance without causing a second layer of fertilizer to be spread over the first layer. This is because moving the mower backward a short distance will cause the first thrust surface to rotate away from the second thrust surface and no rotation movement will be imparted to the first gear. When the mower is again moved forward, the thrust surfaces will re-engage and the device will again spread fertilizer after the mower has reached the position from which the device was moved backward.

A second application of fertilizer can also be avoided by providing a one-way clutch between the rear axle and the second drive member on the fertilizer spreader.

In this embodiment, the spreader includes a hopper having a plurality of mounting legs for positioning the hopper above the housing of the mower and a centrally located vertical shaft extending through the bottom of the hopper. An impeller is attached to the shaft and a second drive member is attached to the bottom thereof. In the preferred embodiment, the first member is a first bevel gear and the second drive member is a second bevel gear which engages the first bevel gear for conveying rotational motion from the axle of the lawn mower to the impeller shaft of the spreader.

The lawn mower is also provided with a clutch to engage or disengage power from the motor to the rear wheels, and the fertilizer spreader has a removable stop for removably blocking the flow of fertilizer from the spreader. To coordinate these two functions, a control lever on the handle is adapted to simultaneously operate both the clutch and the removable stopper such that fertilizer is spread while the clutch is engaged, but not while the clutch is disengaged.

GENERAL DESCRIPTION OF THE DRAWINGS

The present invention will be better understood from a reading of the following detailed description taken in connection with the accompanying drawings wherein:

FIG. 3 is a top view of the fertilizer spreader shown in FIGS. 1 and 2;

FIG. 4 is a fragmentary vertical cross section taken along the line 4—4 in FIG. 3 which particularly shows the regulator and feed orifice adjuster plate of the spreader;

FIG. 5 is a rear view of the spreader particularly showing the feed orifice adjuster mechanism;

FIG. 6 is bottom view of the fertilizer spreader showing the adjuster plate;

FIG. 7A is a cross-sectional view of a regulator bar showing a first embodiment of the teeth thereon;

FIG. 7B is a cross-sectional view of a second regulator bar showing a second embodiment of the teeth thereon;

FIG. 7C is a cross-sectional view of a third regulator bar showing a third embodiment of the teeth thereon;

FIG. 8A is a side elevational view of a first embodiment of the configuration of drive sprockets;

FIG. 8B is a side elevational view of a second embodiment of the configuration of the drive sprockets;

FIG. 8C is a side elevational view of a third configuration of the drive sprockets;

DETAILED DESCRIPTION OF A PREFERRED EMBODIMENT

Figure 1:
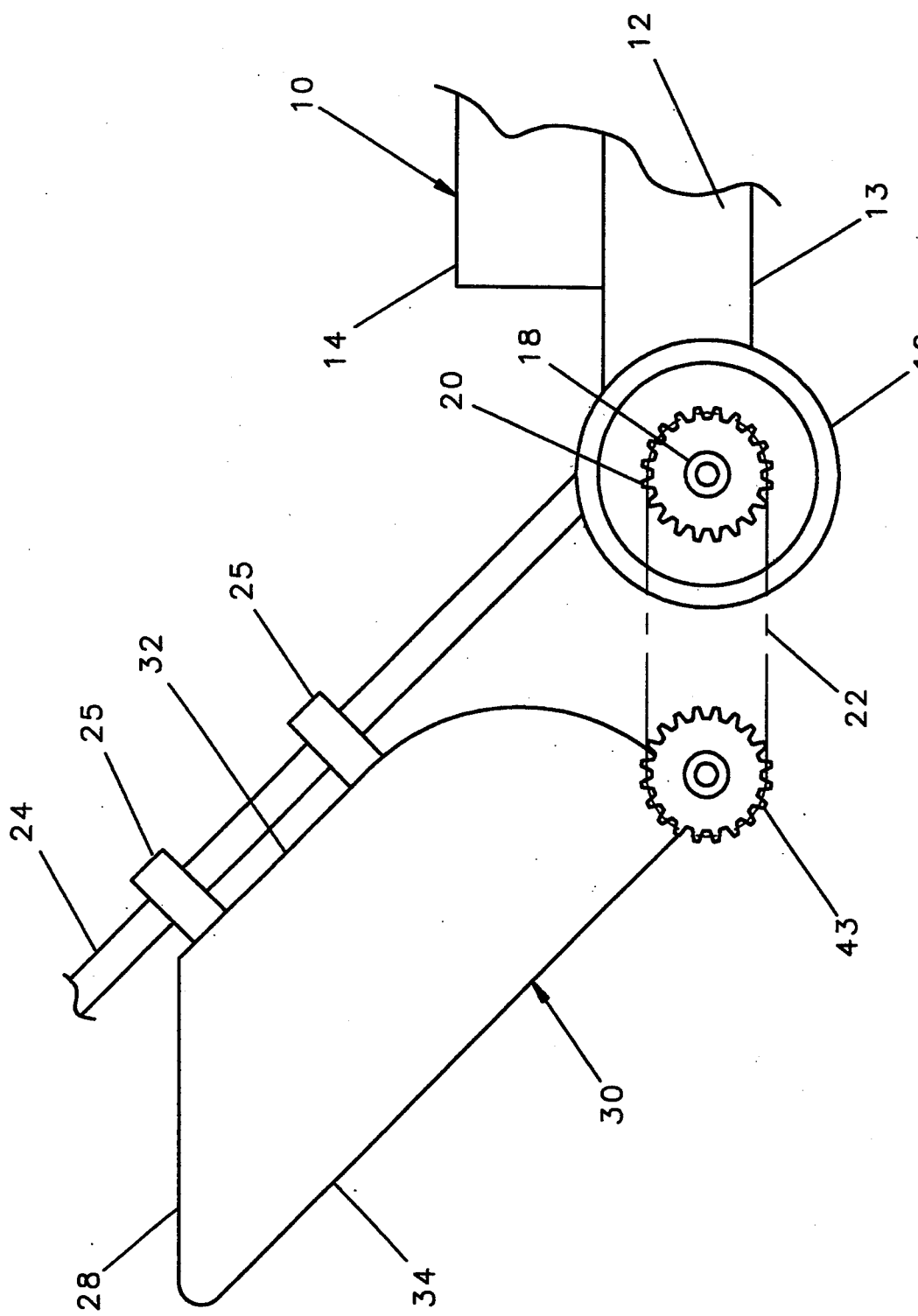
FIG. 1 is a side elevation of a lawn mower to which is attached a fertilizer spreader embodying the present invention.
Figure 2:
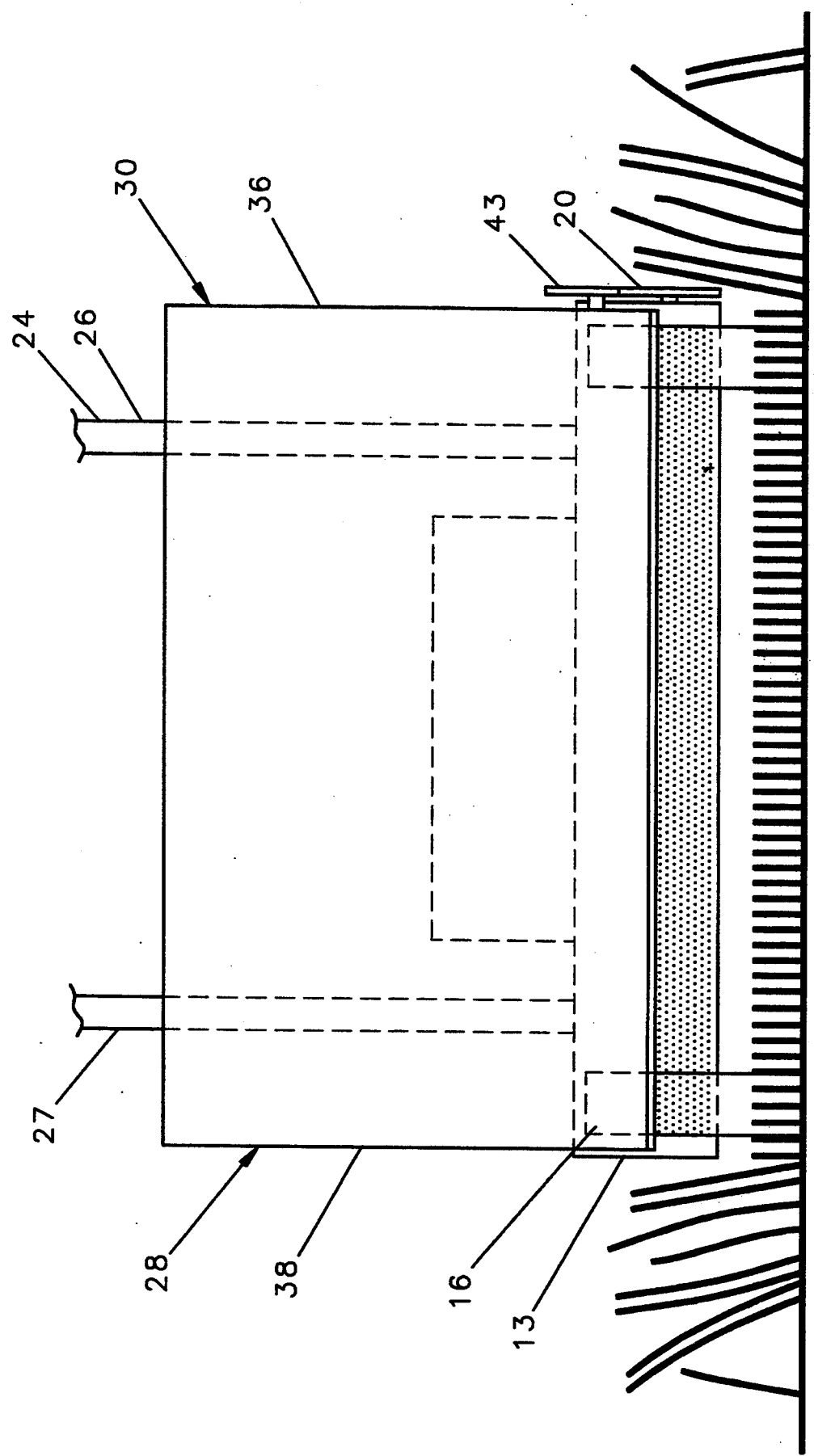
FIG. 2 is a rear elevation of the lawn mower and fertilizer spreader combination shown in FIG. 1 with portions of the lawn mower shown in phantom lines.

Referring now to the drawings and particularly to FIGS. 1 and 2 thereof, there is shown a motor driven lawn mower 10 of the rotary type which includes a housing 12 which covers a cutting blade (not visible) which is adapted to be rotated about a central vertical axis by a drive motor 14.

The housing 12 includes a depending shroud 13 which encloses the sides of the chamber housing the rotating cutting blade or blades for reasons of safety and for preventing the cut grass clippings from being blown in the rearward direction toward the operator. The mower 10 shown in FIGS. 1 and 2 is propelled by the motor 14 which drives the rear wheels 16 of the mower through a suitable drive train, but it should be understood that the invention may also be used with push type mowers which do not include such a drive train.

The rear wheels 16 are mounted to a rear axle 18, and a drive sprocket 20, which drives a drive chain 22, is mounted to the external side of one of the wheels 16 and the axle 18. Consequently, whenever the rear wheels of the mower 10 are rotating and the mower is thus moving, the chain 20 is being driven.

The mower 10 further includes a conventional, generally U-shaped handle 24 which extends rearwardly and upwardly from the housing 12 and includes two rigid side bars 26 and 27. The handle 24 is provided for use in maneuvering the mower during lawn mowing and the like.

A novel fertilizer spreader 30 embodying the present invention is mounted to the handle 24 by means of a plurality of clamps 25 which are attached to the side bars 26 and 27 of the handle 24 and to the spreader. The spreader thus hangs from the handle 24 just rearwardly of the mower housing 12. It includes an open top hopper 28 having front and rear walls 32 and 34 which slope inwardly toward the bottom of the hopper. A pair of substantially planar side walls 36 and 38 are parallel to one another and are connected between the front and rear walls 32 and 34.

At the bottom of the hopper 28 the front and rear walls are arcuate as indicated at 32a and 34a and define a partially cylindrical metering chamber 39 which is open at the top to the chamber in the upper portion of the hopper. A regulator bar 40 having a rod-like central section 41 and a plurality of parallel elongate teeth 42 is journaled near its ends in suitable bearings mounted in the end walls 36 and 38 and is rotatably disposed within the partially cylindrical metering chamber 39. The outer diameter of the regulator bar 40 is slightly less than the internal diameter of the metering chamber 39 to permit rotation of the regulator bar therein but to prevent particles of fertilizer retained in the hopper from passing between the distal ends of the teeth 42 and the wall of the metering chamber. A sprocket 43 is affixed to one end of the regulator bar 40 and is driven by the chain 22 as the sprocket 20 is rotated.

A plurality of closely spaced triangular feed orifices 44 are provided in the very bottom of the metering chamber 39 in a line which is perpendicular to the direction of travel of the mower. As the regulator is rotated, fertilizer particles carried by the space between the teeth 42 are sequentially positioned above the feed orifices 44 and thus drop onto the lawn below the orifices. When the mower is stopped, the regulator also stops rotating whereby no fertilizer particles are supplied to the feed orifices. Because of the large number of teeth 42, when the mower is moved backward for a short distance, no fertilizer particles are supplied to the feed orifices 44 because reverse rotation of the regulator moves only empty ones of the spaces between the teeth 42 over the feed orifices.

In order to adjust the amount of fertilizer being spread as the mower moves through a given distance, there is provided an adjustment plate 46 which has a plurality of openings 48 equal in number and spacing to the feed orifices 44. The plate is slidable across the bottom of the hopper and its position is controlled by means of an adjustment lever 50, which is affixed to the plate 46 as best shown in FIG. 5, and pivotally connected to the hopper at 52. The upper end of the lever 50 extends through a slot 54 at the front end of the hopper as shown in FIG. 3 adjacent to a graduated adjustment indicator 56.

In addition to controlling the size of the feed orifices 44, the flow rate for dispensing fertilizer may also be controlled by replacing the regulator bar 40 with a different bar having different sized spaces between the teeth 42 thereof. In FIG. 7A, 7B, 7C three different tooth configurations are disclosed on three different regulator bars 40A, 40B, 40C. In these figures, the teeth 42A on bar 40A have a minimal space between them whereas the spacing between the teeth 42C of regulator bar 40C is greater than the space between the teeth of either bar 40A or 40B.

As shown in FIG. 8A, 8B and 8C, the rate of dispensing fertilizer can also be regulated by altering the relative sizes of the two sprockets 20, 43. In FIG. 8A, the spreader sprocket 43A is about the same size as the wheel sprocket 20A resulting in a given flow rate of fertilizer. Substituting the sprockets 20B, 43B shown in FIG. 8B will result in a reduced flow rate whereas substituting the sprockets 20C, 43C shown in FIG. 8C will result in an increased flow rate.

When the fertilizer spreader 10 is to be used for the first time, the sprocket 18 is first attached to the wheel 16 and axle 18. The hopper is then hung on the handle 24 of the mower 10 by means of the clamps 25 and the drive chains 22 is assembled to the sprockets 20 and 43. With the hopper filled with dry fertilizer particles, and the adjustment plate 46 set to the desired setting, when the mower is operated and propelled in a forward direction, the fertilizer particles are metered to the feed orifices 44 and dropped onto the area of the lawn therebelow. When the mower is stopped, no fertilizer particles are dropped through the feed orifices 44. When the adjustment lever 50 is moved to the closed position wherein the opening 48 are located out of alignment with the feed orifices 44, the spreader will cease dropping fertilizer even though the mower may continue to move forward.

As the mower is moved across a lawn and a swath of grass is cut, fertilizer particles are dropped onto the freshly cut area of the lawn. Because of the shroud on the mower housing, the fertilizer particles are not blown away from the mowed swath, whereby accurate application of fertilizer to a lawn is greatly facilitated by simply watching where the lawn has just been mowed.

Figure 9:
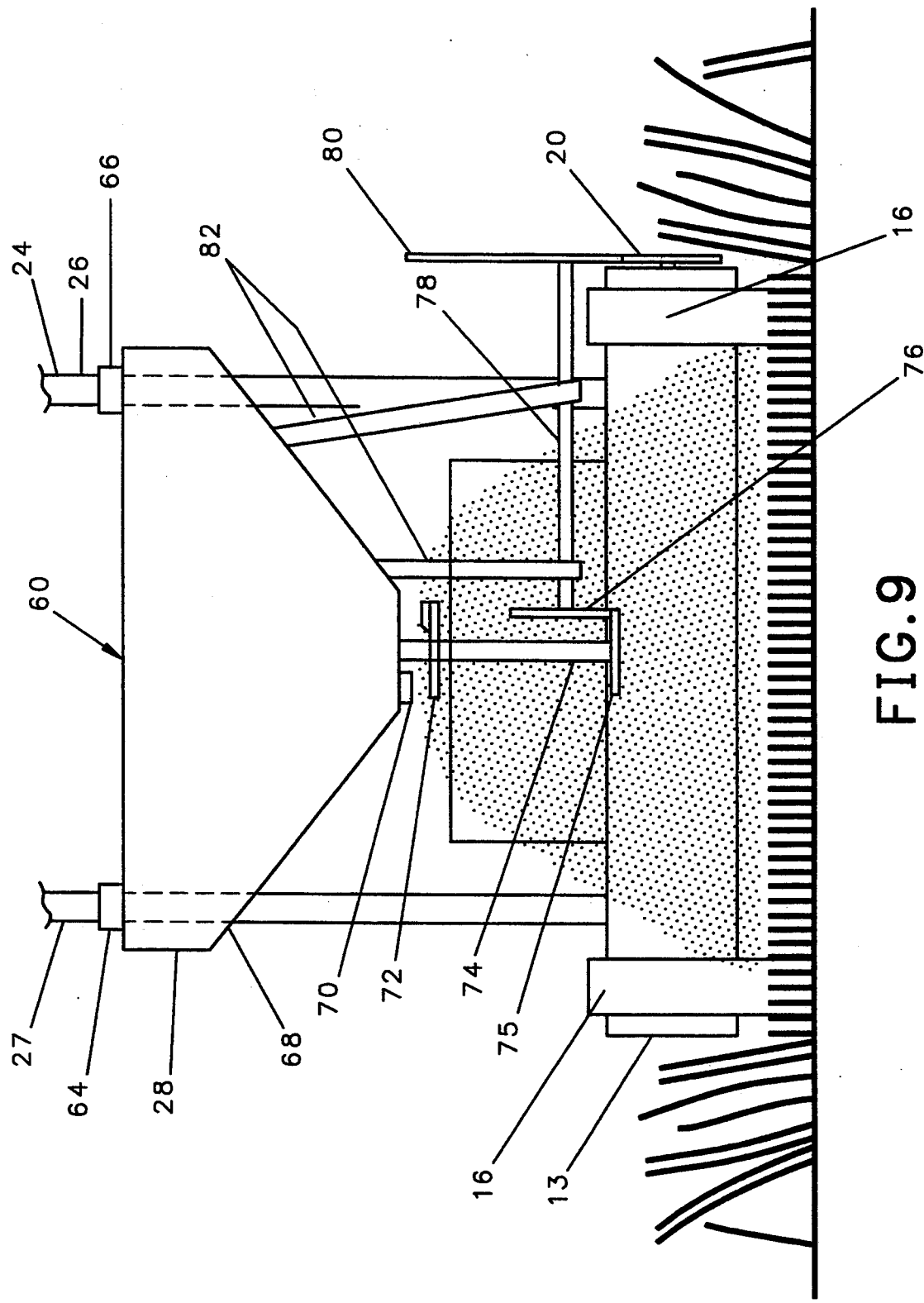
FIG. 9 is a rear elevation of a lawn mower employing a second embodiment of the invention.

Another embodiment of the present invention is shown in FIG. 9 wherein a broadcast type spreader 60 is employed. In this embodiment, the spreader 60 is attached to the side bars 27, 28 of the handle 24 by clamps 64, 66 similar to those employed in the first embodiment. The spreader 60 has a hopper 68 which tapers downward, and at the bottom thereof there is located an adjustable size outlet 70, of the type well known in the art, with which the size of the outlet can be increased, decreased, opened or closed by the operator of the lawn mower 10. Controlling the size of the outlet 70 therefore controls the volume of fertilizer spread over a given area.

To disburse the fertilizer falling from the orifice 70, the spreader 60 has an impeller 72 mounted on a vertical shaft 74. The vertical shaft 74 has a bevel gear 75 which engage a drive gear 76 mounted on a horizontal shaft 78 and driven by a sprocket 80. the shaft 78 and sprocket 80 are retained by a plurality of support bars 82 attached at one end to the hopper 68 and at the other end to a bearing around the shaft 78. The impeller 72 is sized so as to throw fertilizer over a path which is approximately equal to the width of the swath cut by the lawn mower.

Figure 10:
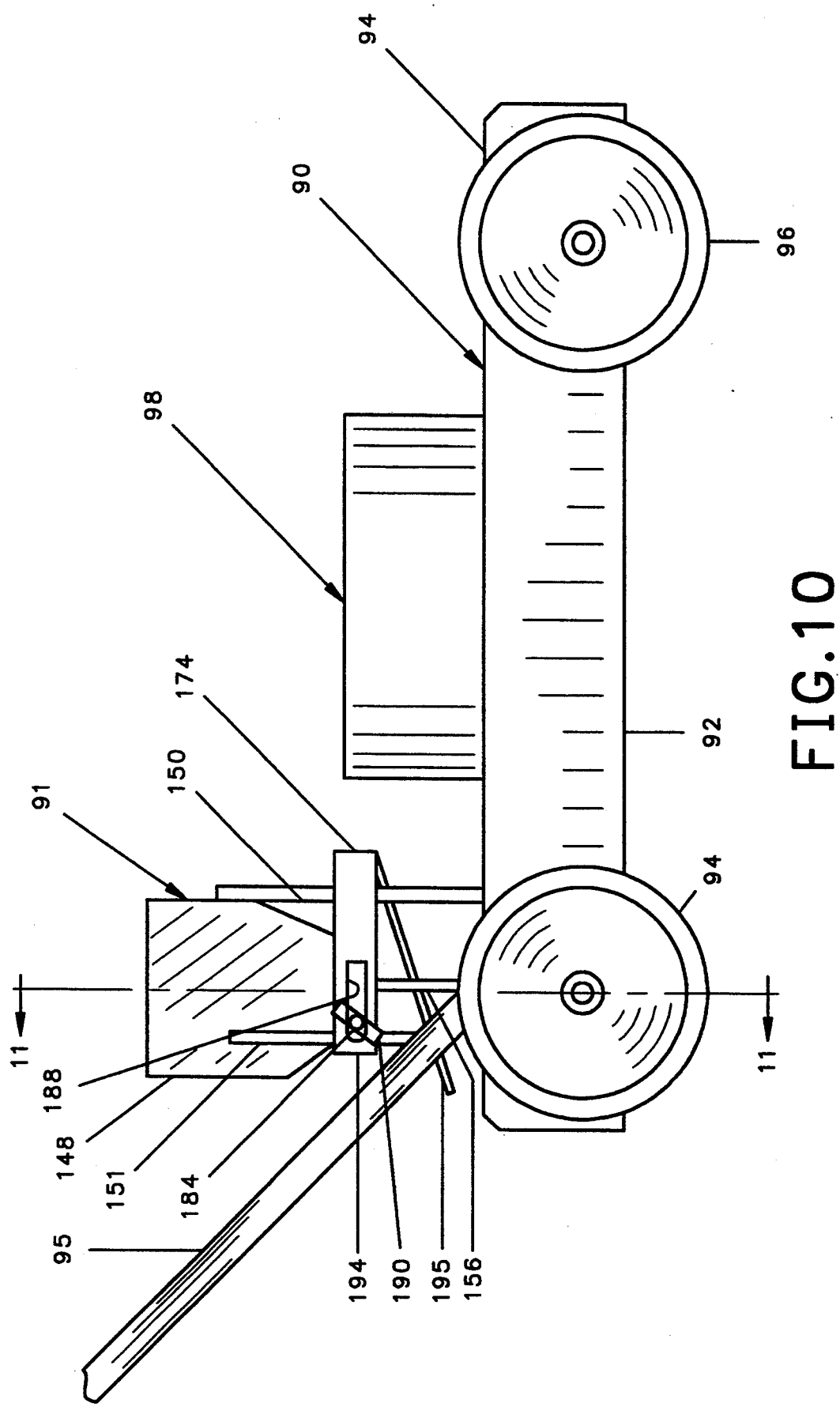
FIG. 10 is a side elevation of another embodiment of the invention wherein a lawn mower has a spreader attached thereto with portions thereof shown in broken lines.
Figure 11:
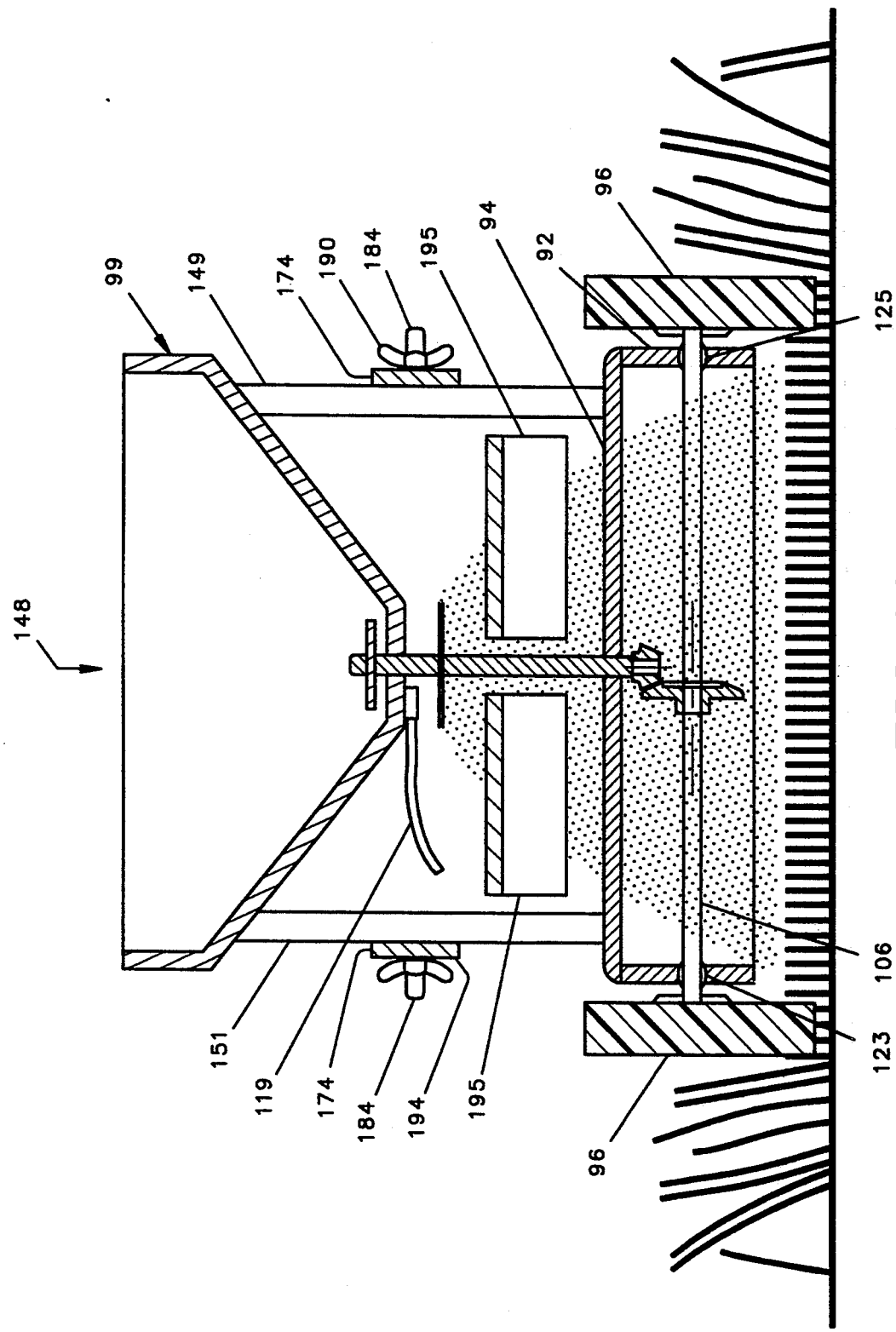
FIG. 11 is a cross-sectional view of the mower and spreader shown in FIG. 10 taken through line 11—11 of FIG. 10.
Figure 12:
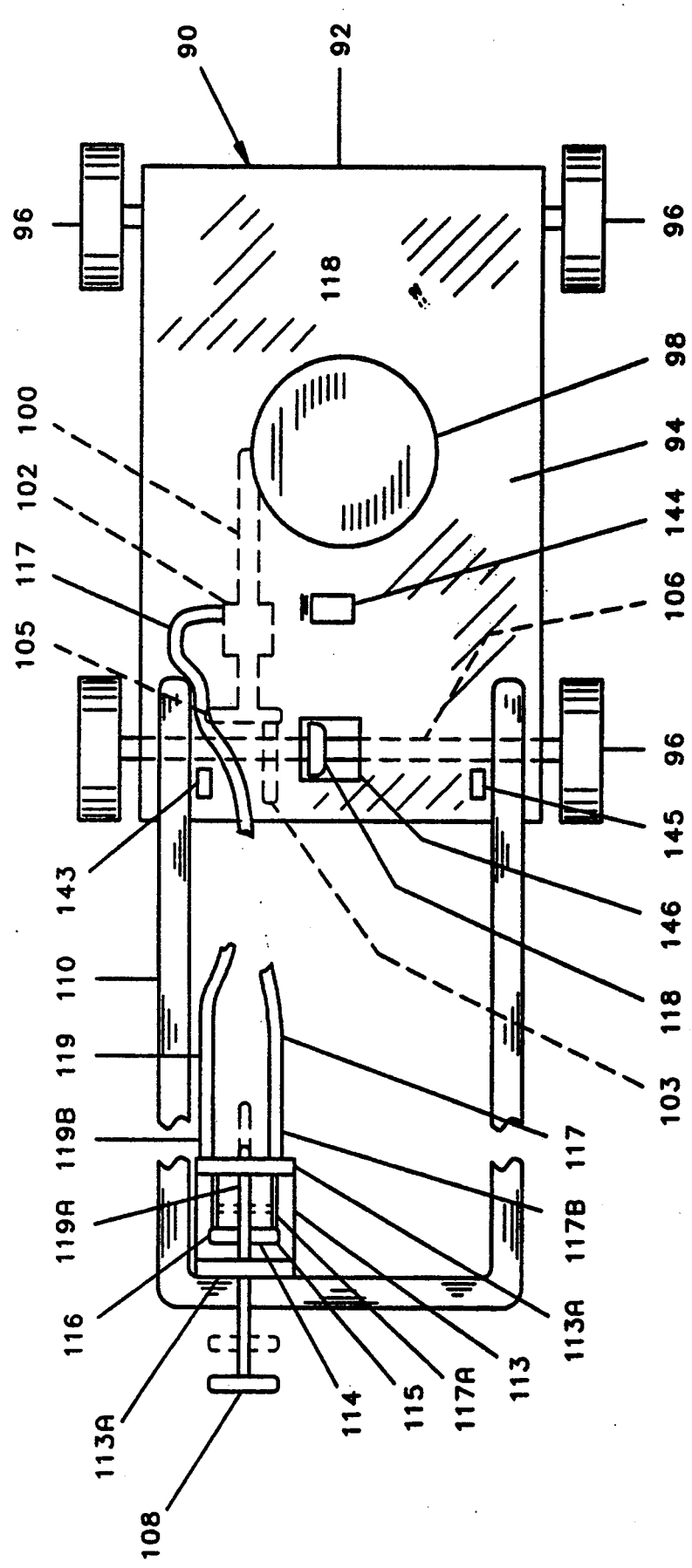
FIG. 12 is a top view of the mower shown in FIG. 10 with the spreader removed and portions of the mower shown in broken lines.

Referring to FIGS. 10, 11 and 12, another embodiment of the invention is depicted. In this embodiment, a lawn mower 90 has a housing 92 with a depending shroud which surrounds a cutting blade and has a generally-planar upper surface 94 oriented parallel to the ground across which the mower is being operated. The mower 90 further has four wheels 96, one of which is positioned at each side of the front of the mower and one of which is positioned at each side of the rear thereof. A motor 98 mounted on the upper surface 94 is adapted to drive the cutting blade and to drive the rear wheels 96 of the mower 90 as is further described below. A fertilizer spreader 99 in accordance with the present invention is mounted on the upper surface 94 of the housing 92.

As shown in phantom lines in FIG. 12, the mower further includes a drive shaft 100, one end of which is drivingly connected to the motor 98 by means well known in the art, and the other end of which is attached to a clutch 102. The clutch 102 is also attached to a second shaft 104 which is drivingly engaged to the rear axle 106 of the mower 90 using any suitable means, such as a pair of bevel gears 103, 105. A control lever 108 positioned on the handle 110 has a first position shown in solid lines and a second position shown in broken lines which correspond to disengagement and engagement of the clutch 102, respectively. Engagement of the clutch 102 causes rotational power from the motor 98 and the first drive shaft 100 to be engaged with the axle 106 to which the rear wheels 96 are non-rotatably attached, and causes the mower to be propelled forward.

Referring to FIG. 12, the control lever 108 consists of a shaft 111 with a handle 112 at one end thereof, and the shaft 111 is adapted to slide axially through holes, not shown, in flanges 113A and 113B at the ends of a mounting bracket 113. A cross member 114 is fixed to the shaft 111 and has two ends 115, 116 each of which attach to an end of the inner wire of a push-pull type cable of the type generally used for the remote controlling of the functions of such lawn mowers. One cable 117 has one end of the inner wire 117A attached to end 115 and the outer sheath 117B attached to flange 113B of the bracket 113 and the other end of cable 117 is operatively connected to the clutch 102. Movement of the lever 108 operates the clutch 102 and engages or disengages the motor 98 to the axle 106, and the rear wheels 96. The sheath 119B of a second cable 119 is removably attached to flange 113B and the inner wire 119A is removably connected to end 116 of cross member 114 by methods known in the art, such as removable clamps. The second cable 119 operates the fertilizer spreader 99 as further described below.

Figure 13:
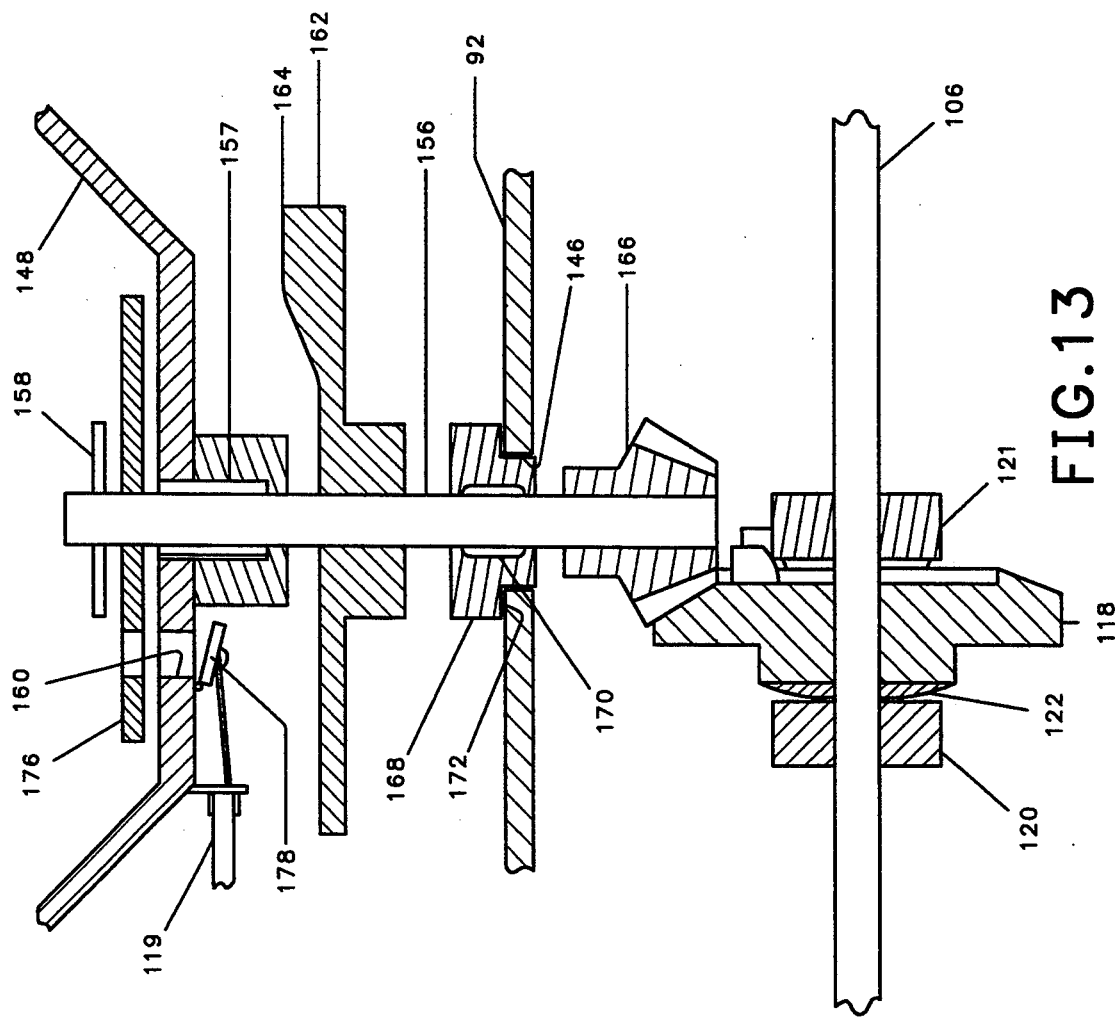
FIG. 13 is a fragmentary enlarged view of the axle, bevel gears, and vertical shaft as shown in FIG. 11.

Referring to FIGS. 11 and 13, the rear axle 106 is journaled for rotation in bearings 123, 125 positioned on each side of the housing 92, and the rear wheels 96 are non-rotatably mounted to the ends of axle 106. Rotatably mounted near the center of the axle 106 is a first drive member which in the preferred embodiment, is a bevel gear 118. Two retaining collars 120, 121, are non-rotatably mounted one on each side of the drive member 118 preventing longitudinal movement of the bevel gear 118 along the axle 106. Also a spring 122 positioned between one retaining collar 120 and the first bevel gear 118 urges the first bevel gear 118 against a bearing surface on the second retaining collar 121.

Figure 15:
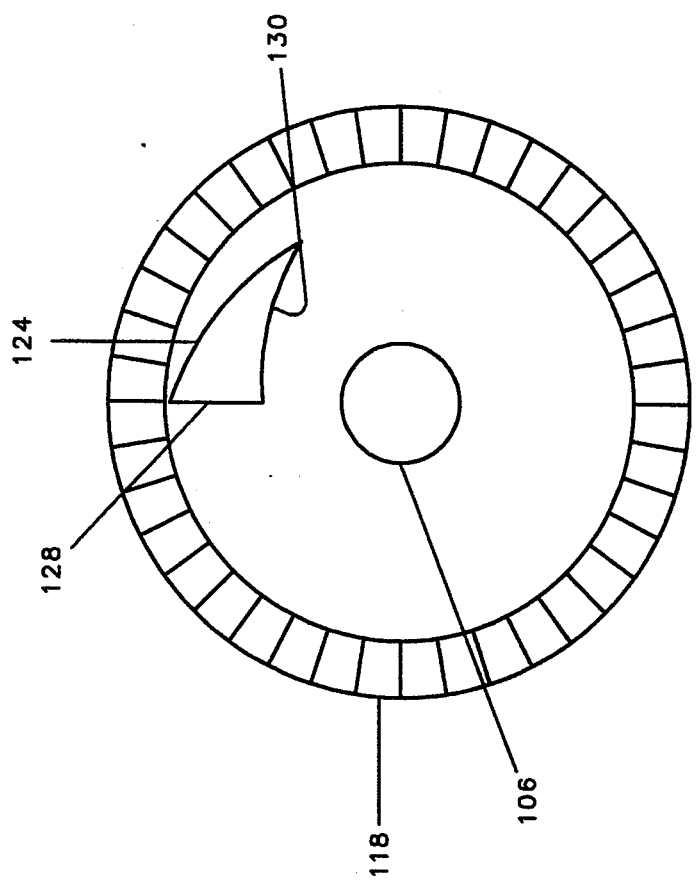
FIG. 15 is an enlarged end view of the first drive member, or bevel gear shown in FIGS. 11 and 13, which engages the pivot member shown in FIG. 14.
Figure 14:
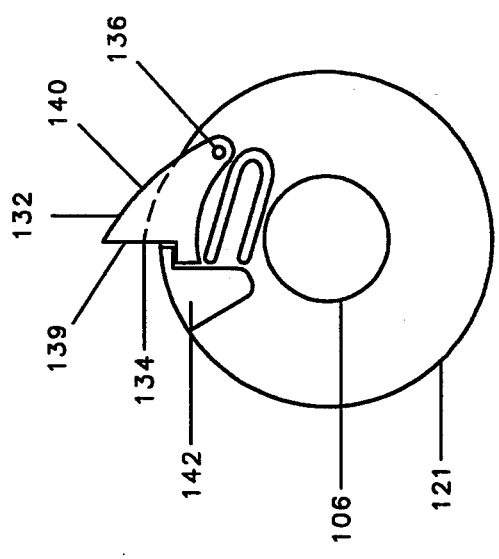
FIG. 14 is an enlarged end view of a drive collar attached to the rear axle of the mower in FIG. 10 with a pivot member shown in solid lines in a first position and in broken lines in a second position.

As shown in FIG. 15, the first bevel gear 118 has a projection 124 positioned on one face 126 thereof, and the projection 124 has a first driving surface 128 oriented co-planar with the axis of the axle 106. An arcuate shaped cam surface 130 on the projection 124 is located on the radially inward side of the gear 118. A pivot member 132 which is positioned on the outer circumference of the second retaining collar 121 extends radially outwardly from the outer surface of the axle 106. The pivot member 132 has a second driving surface 134 which is also co-planar with the axis of axle 106 and engages the first driving surface 128 of the bevel gear 118. As can be seen in FIG. 14, the member 132 is elongated, has an upper arcuate surface 140, and is pivoted about a pin 136 at one end thereof. A spring 138 urges the free end 139 of the pivot member 132 radially outwardly against a retaining stop 142 on the collar 121.

Rotation of the axle 106 and the retaining collar 121 in a counterclockwise direction as seen in FIG. 14 will result in movement of the second driving surface 134 against the first driving surface 128 of the bevel gear 118 and causes rotation of the bevel gear 118. Rotation of the axle 106 and the collar 121 in the reverse direction will cause the upper arcuate surface 140 to engage the arcuate cam 130 on the projection 124 on the bevel gear 118. As the collar 121 continues its clockwise rotation, the second end 139 of the pivot member 132 will be moved radially inwardly compressing the spring 138, and rotational movement will not be conveyed from the axle 106 to the first bevel gear 118.

The second collar 121, cam 130 and pivot member 132, are, therefore, a one-way clutch conveying rotation of movement to the first bevel gear 118, only when the mower 90 is moving in a forward direction.

Referring to FIG. 12, the upper surface 94 of the housing 92 has a plurality of holes positioned therein. Two holes 143, 144 are positioned near the rear of each side of the housing 92 and a short distance behind the axle 106, and one hole 145 positioned forward of the axle 106. A fifth opening 146 in the upper surface of the housing 92 is rectangularly shaped and positioned over the axle 106 midway between the two rear wheels 96. The fifth opening 146 is sufficiently large to receive a shaft from a fertilizer spreader 99 with a bevel gear attached thereto and a mounting collar as further described below. The mower 90 may also include a spring door, not shown, which would close over the fifth opening 146 when the spreader 99 is not attached thereto to prevent damage to the parts or injury to an operator caused by foreign objects entering the fifth opening 146 while the mower is in operation.

Referring to FIGS. 10 and 11, the fertilizer spreader 99 which is attachable to the lawn mower 90 has a hopper 148 suitable for retaining a quantity of fertilizer supported by a plurality of downwardly extending legs 149, 150, 151. The lower ends of each of the legs 149, 150, 151 is aligned to fit within one of the holes 143, 144, 145 in the upper surface of the housing 92.

Figure 16:
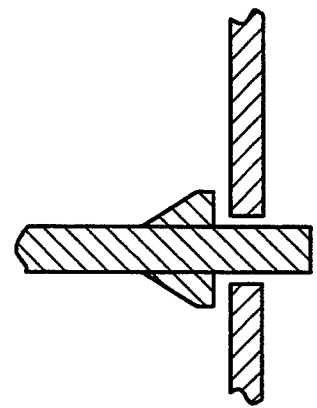
FIG. 16 is an enlarged fragmentary cross-sectional view of a portion of the mower and spreader shown in FIG. 10 showing a portion of a leg of the spreader fitted into the housing of the mower.

As best shown in FIG. 16, which depicts the end of one leg 149, each leg has an annular bead 152 near the distal end 154 thereof which rests on the upper surface 94 of the housing. The spreader 99 may then be positioned on a mower 90 by inserting the distal end 154 of each leg 149, 150, 151 into its associated hole 143, 144, 145 on the upper surface of the housing 92.

As best shown in FIGS. 11 and 13, the spreader 99 is a broadcast-type spreader and has a vertically oriented shaft 156 journaled for rotation in the bearing 157 in the bottom of the hopper 148. A transverse pin 158 extending through the upper end of the shaft 156 prevents the upper end of the shaft from sliding downwardly through the bearing 157 and also directs particulate fertilizer towards an orifice 160 in the bottom of the hopper 148. Below the journal 157 is a disc-shaped impeller 162 having a plurality of ribs 164 thereon for disbursing particulate fertilizer which falls through the orifice 160.

At the lower end of the shaft 156 is a second drive member which in the preferred embodiment is a second bevel gear 166 adapted for engaging the first bevel gear 118. Immediately above the second bevel gear 166 is a mounting collar 168 having a rectangular outer shape and a centrally located bearing 170 through which the shaft 156 extends.

The lower portion of the collar 168 is sized to fit within the rectangularly shaped fifth opening 146 in the upper surface 94 of the mower housing 92, and an exterior flange 172 around the upper portion of the collar 168 retains the collar on the upper surface of the housing 92. The second bevel gear 166 extends through the fifth opening 146 and engage the first bevel gear 118 when the legs 149, 150, 151 are fitted in the holes 143, 144, 145 in housing.

Referring to FIGS. 10 and 11, the spreader further includes a generally arcuately shaped shield 174 which extends 180 degrees around the forward side of the vertical shaft 156 and the impeller 162 to direct particulate fertilizer disbursed by the impeller 162 in a rearward direction.

The shield 174 is attached to the two rear legs 149, 151 by a pair of threaded studs 184-184 extending horizontally outward and into horizontal slots in the ends of the shield 174, one of the slots 188 being depicted in FIG. 10. The shield is removably secured to the legs 149, 151 by a pair of wing nuts 190-190. The distal ends of the shield one of which 194 is visible in FIG. 10, are movable forward or rearward by loosening the wing nuts 190 and sliding the slotted shield 174 forwardly or rearwardly over the studs 184. Moving the shield 174 rearwardly causes the ends 194 of the shield to obstruct a greater portion of the flow of particulate matter which is distributed perpendicular to the direction of movement of the lawn mower, and thereby narrow the path of particulate matter disbursed by the spreader. Moving the shield forward, on the other hand, allows a wider path of particulate matter disbursed by the spreader. Particulate matter which strikes the shield will fall on the upper surface of the housing and slide off the back of the mower to the ground. The shield may also have a ramp surface 195 on each side of the shaft 156 to direct the particulate matter off the rear of the mower.

An adjustment means is also provided to adjust the area of the orifice 160 and, therefore, the volume of fertilizer spread over a given area. Typically, the adjustment means is a circular plate 176 rotatably mounted on the shaft 156 adjacent the inner surface of the hopper 148 and having a hole 177, which can be aligned over the orifice 160. Aligning the hole 177 with the orifice 160 will allow the maximum flow of fertilizer, and a misalignment of the hole with the orifice will restrict the flow of fertilizer.

A removable stop 178 is positioned immediately below the orifice 160. The stop 178 is movable from a first position in which the orifice 160 is blocked and fertilizer cannot flow therethrough, to a second position in which stop 178 is not blocking the orifice 160.

The movement of the stop 178 is controlled by the cable 119, one end of which is operatively connected to the stop 178 using methods known in the art. The other end of the cable 119 is removably attached to the control lever 108 as previously described above. When the control lever 108 is in the first position, the clutch 102 is disengaged and the stop 178 blocks the orifice 160, and when the lever 108 is in a second position, the clutch 102 is engaged, and the stop 178 is removed from the orifice 160.

It should be appreciated that the cable 119 could attach to a bracket mounted near the clutch 102 instead of a bracket on the handle. In such a configuration, the cable 117 would move an operative lever of the clutch, not shown, and movement of the operative lever would move the wire 119A within the cable 119B and thereby operate removable stop 178.

Figure 18:
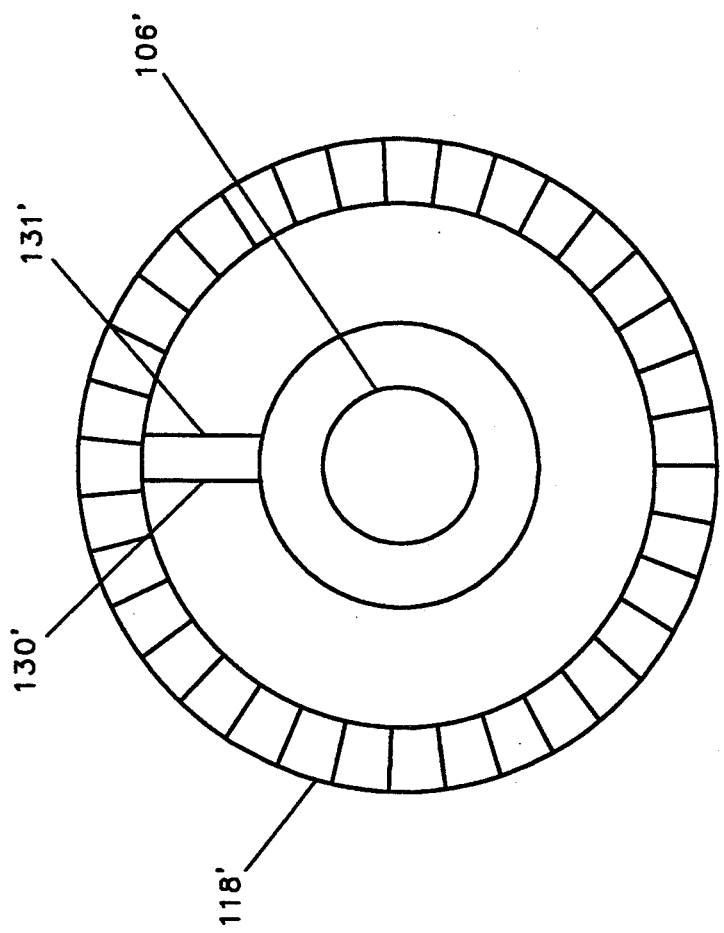
FIG. 18 is an enlarged end view of an alternate embodiment of a first drive bevel gear.
Figure 17:
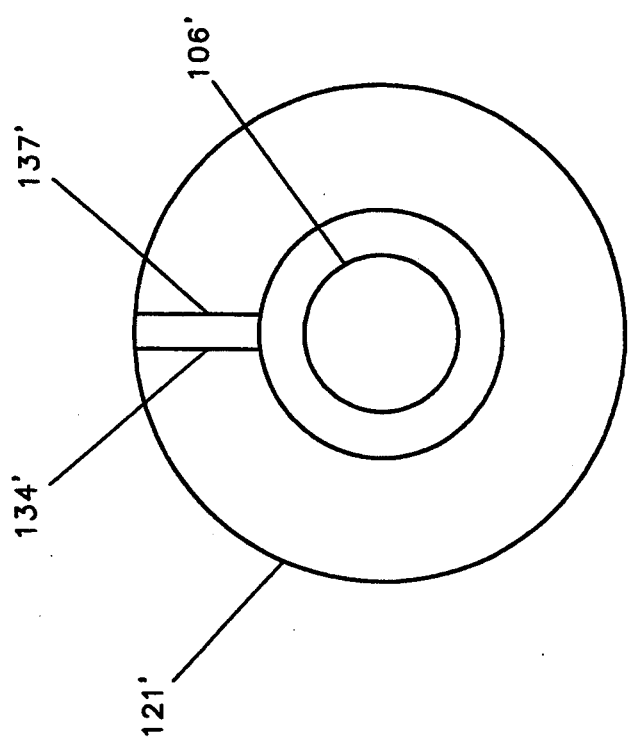
FIG. 17 is an enlarged end view of an alternate embodiment of a drive collar.

In FIGS. 17 and 18, a modified embodiment of the drive between the collar and the bevel gear is depicted. In these figures, parts similar to those depicted in FIGS. 14 and 15 bear similar indicia numbers except that they are primed. As can be seen, the first bevel gear 118' has a projection 124' thereon with opposing drive surfaces 130', 131' each of which are co-planar with the axis of rotation of the axle 106'. Similarly, the collar 121' has a projection 133' thereon which has opposing drive surfaces 134', 137' which are also co-planar with the axis of rotation of the axle 106' and are the same radial distance from the surface of the axle as are the surfaces 130', 131' of the bevel gear 118'. Movement of the lawn mower in a forward direction causes the drive surface 134' of the collar 121' to engage surface 130' of the gear 118' and convey rotational movement to the bevel gear 118'. Thereafter, if the mower is stopped and moved backward, the drive surface 134' of the collar 121' will move away from the surface 130' of the gear 118' and no rotational power will be conveyed to the gear 118 until the collar 121' has nearly completed one revolution. As a result, the mower can again be moved backward a short distance without causing the impeller of the fertilizer spreader to be rotated. In this embodiment the one-way clutch is eliminated.

An operator may use the present invention to apply fertilizer to his lawn, with the blade engaged such that the lawn is also being mowed, or with the blade disengaged. To apply fertilizer, the spreader 99 is attached to the lawn mower 90 by fitting the legs 143, 144, 145 into the holes 149, 150, 151 and the second bevel gear 166 and mounting collar 168 in the fifth opening 146. The control cable 119 is then attached to the lever 108 on the handle 110 and the adjustment means 176 adjusted to allow the desired amount of particulate material to pass through the orifice 160. The handle 110 is moved to the first position and the hopper 148 is then filled with particulate fertilizer and the motor 98 started. When the mower is at a location where the operator desires to commence fertilizing, the control lever 108 is moved from the first position to the second position, thereby opening the removable stop 178 and allowing particulate material to flow through the orifice 160 while simultaneously engaging the clutch 102. The motor will commence rotating the axle and the drive means formed by the collar 121 and the first bevel gear 118 will translate rotational power to the second bevel gears 166 and rotate the impeller 162.

Particulate fertilizer in the hopper will be directed by the pin 158 through the orifice 160 and onto the impeller 162 for distribution rearward of the mower 90 while the mower is moved in a forward direction.

At such time as the operator moves the lever 108 to disengage the clutch 102 and, therefore, the power to the rear wheels, the stop 178 will be simultaneously moved over the orifice 160. Also, the shaft 156 will cease rotating, and the distribution of particulate matter will stop. If the lawn mower has a one-way clutch, the impeller will not rotate during movement of the mower in a backward direction. If the mower is fitted with a collar 121' and first bevel gear 118' in accordance with the alternate embodiment, movement of the mower a short distance backwards where each wheel 96 rotates less than 360 degrees, the second driving surface 134' of the collar 121' will move away from the driving surface 130' of the bevel gear 118'. When the mower is again moved forward, these surfaces will engage again after the mower is moved an equal distance forward. Where the wheels 96 have a diameter of approximately eight inches, the mower may be moved backwards approximately two feet and, thereafter, moved forward and the fertilizer spreader will not apply a second layer of fertilizer over the area which was previously traversed. This will occur even if the clutch 102 has been engaged and the orifice 160 opened to move the mower forward.

It should also be appreciated the drive means, including the gear 118, 118' and the collar 121, 121' shown with respect to the spreader 99 mounted on the housing of the mower, and the control lever 106 which operates both the clutch 102 and the stop 178, can be provided in a broadcast spreader 60 of the type which is suspended from the bars 27, 28 of a handle and driven by a sprocket or belt from a wheel 96.

While the present invention has been described in connection with particular embodiments thereof, it will be understood that those skilled in the art may make many changes and modifications without departing from the true spirit and scope of the invention. Therefore, it is intended by the appended claims to cover all such changes and modifications which come within the true spirit and scope of the invention.

What is claimed:

1. A lawn mower comprising in combination:
   a housing;
   a motor;
   a plurality of wheels attached to said housing for transporting said mower across a surface;

means for drivingly connecting said motor to a cutting blade;

a shaft journalled for rotation in said housing;

means for engaging said shaft to said motor;

first drive means rotatably mounted to said shaft for driving a fertilizer spreader removably attached to said lawn mower;

a collar on said shaft having a first surface therein;

said first drive means having a second surface for engagement with said first surface of said collar for conveying rotational movement to said first drive means when said first and second surfaces are engaged.

2. A lawn mower in accordance with claim 1 wherein said means for engaging said shaft to said motor is a clutch.

3. The combination comprising:

a lawn mower having a housing, a handle, a plurality of wheels, and a motor drivingly connected to a cutting blade;

a first shaft journaled for rotation on said lawn mower;

clutch means for selectively engaging and disengaging said motor to said shaft;

a first drive member mounted on said first shaft;

a fertilizer spreader removably attached to said housing of said lawn mower;

said fertilizer spreader having a hopper and a second shaft journalled for rotation, and having means attached to said second shaft for disbursing fertilizer, said hopper having an outlet orifice positioned above said means for disbursing fertilizer;

stop means for selectively blocking and unblocking said orifice;

a second drive member on said fertilizer spreader for engaging said first drive member and conveying rotational movement to said second shaft;

a lever on said handle;

a first cable operatively connecting said clutch means to said lever; and a removable second cable operatively movable by said lever.

4. The combination in accordance with claim 3 further comprising:

a one-way clutch for conveying rotational movement from said first shaft to said second shaft when said first shaft is rotated in a first direction.

5. The combination in accordance with claim 3 wherein said first drive member and said second drive member are bevel gears.

6. The combination in accordance with claim 3 wherein said first shaft is a rear axle of said lawn mower.

7. A lawn mower comprising in combination:

a housing;

a motor;

a plurality of wheels attached to said housing for transporting said lawn mower across a surface;

means for drivingly connecting said motor to a cutting blade, a first shaft journalled for rotation in said housing, means for engaging said first shaft to said motor;

a fertilizer spreader removably attached to said housing, first drive means mounted to said first shaft for driving a second shaft in said fertilizer spreader, wherein the position at which said first drive means is mounted to said first shaft is in said housing; and a one-way clutch for directing rotational movement to said second shaft when said first shaft is rotated in a first direction.

8. A lawn mower in accordance with claim 7 wherein said means for engaging said first shaft to said motor is a clutch.

* * * * *